US007886171B2

(12) United States Patent
Kishimoto et al.

(10) Patent No.: US 7,886,171 B2
(45) Date of Patent: Feb. 8, 2011

(54) MUSIC REPRODUCING DEVICE THAT TEMPORARILY MEMORIZES MUSIC INFORMATION FROM NOTIFYING SECTION WHEN OPERATING FUNCTION UNIT IS INACTIVE

(75) Inventors: Mao Kishimoto, Osaka (JP); Mitsuya Nakahara, Osaka (JP)

(73) Assignee: Panasonic Corporation, Osaka (JP)

( * ) Notice: Subject to any disclaimer, the term of this patent is extended or adjusted under 35 U.S.C. 154(b) by 743 days.

(21) Appl. No.: 11/896,001

(22) Filed: Aug. 29, 2007

(65) Prior Publication Data

US 2008/0178027 A1   Jul. 24, 2008

(30) Foreign Application Priority Data

Aug. 29, 2006   (JP)   ............................. 2006-232367

(51) Int. Cl.
G06F 1/26   (2006.01)
(52) U.S. Cl. ..................... 713/323; 381/124; 710/52
(58) Field of Classification Search ................. 713/323, 713/320; 381/124; 710/52
See application file for complete search history.

(56) References Cited

U.S. PATENT DOCUMENTS

| 7,075,744 B2 * | 7/2006 | Cumpson et al. ......... 360/73.03 |
| 2002/0035692 A1 | 3/2002 | Moriai |
| 2002/0072818 A1 | 6/2002 | Moon et al. |
| 2002/0087225 A1 | 7/2002 | Howard |
| 2005/0066209 A1 | 3/2005 | Kee et al. |
| 2005/0231500 A1 | 10/2005 | Isobe et al. |
| 2005/0253808 A1 | 11/2005 | Yoshida |
| 2005/0268126 A1 | 12/2005 | Lee |
| 2006/0044948 A1 | 3/2006 | Hashimoto |
| 2006/0065709 A1 | 3/2006 | Yamashita |
| 2006/0200573 A1 | 9/2006 | Lin |
| 2007/0204182 A1 | 8/2007 | Moriai |

FOREIGN PATENT DOCUMENTS

| JP | 2001-054184 | 2/2001 |
| JP | 2002-041096 A | 2/2002 |
| JP | 2002-101192 A | 4/2002 |

(Continued)

OTHER PUBLICATIONS

Japanese Office Action issued in Japanese Patent Application No. JP 2006-232367 dated Jul. 27, 2010.

*Primary Examiner*—Albert Wang
(74) *Attorney, Agent, or Firm*—McDermott Will & Emery LLP (57) ABSTRACT

A music reproducing device comprises an operating function unit and a reproducing function unit, wherein the reproducing function unit comprises an information notifying section for notifying the operating function unit of information of a piece of music to be reproduced, a notification controlling section for controlling the notification of the music information to the operating function unit by the information notifying section when the operating function unit is in an inactive state, and a memory section for temporarily memorizing the music information from the information notifying section when the operating function unit is in the inactive state, and the operating function unit comprises an information obtaining section for obtaining the music information from the memory section when the operating function unit recovers from the inactive state to an active state.

5 Claims, 9 Drawing Sheets

FOREIGN PATENT DOCUMENTS

| | | |
|---|---|---|
| JP | 2002-182804 | 6/2002 |
| JP | 2005-208265 | 8/2005 |
| JP | 2005-303935 | 10/2005 |
| JP | 2005-328379 | 11/2005 |
| JP | 2006-054026 | 2/2006 |
| JP | 2006-094414 A | 4/2006 |

* cited by examiner

MUSIC REPRODUCING DEVICE THAT TEMPORARILY MEMORIZES MUSIC INFORMATION FROM NOTIFYING SECTION WHEN OPERATING FUNCTION UNIT IS INACTIVE

FIELD OF THE INVENTION

The present invention relates to a technology useful to a music reproducing device and a moving picture reproducing device such as a portable music player, a portable video player and a mobile telephone which demand a long-duration music reproducing function, and capable of reducing power consumption and thereby realizing the long-duration music reproducing function.

BACKGROUND OF THE INVENTION

As a technology for reducing power consumption in a conventional music reproducing device, there was proposed a method of halting power supply to an amplifier circuit while music is not reproduced (for example, see 2002-182804 of the Japanese Patent Publication Laid-Open (Pages 3-4, FIG. 2)).

Figure 9:
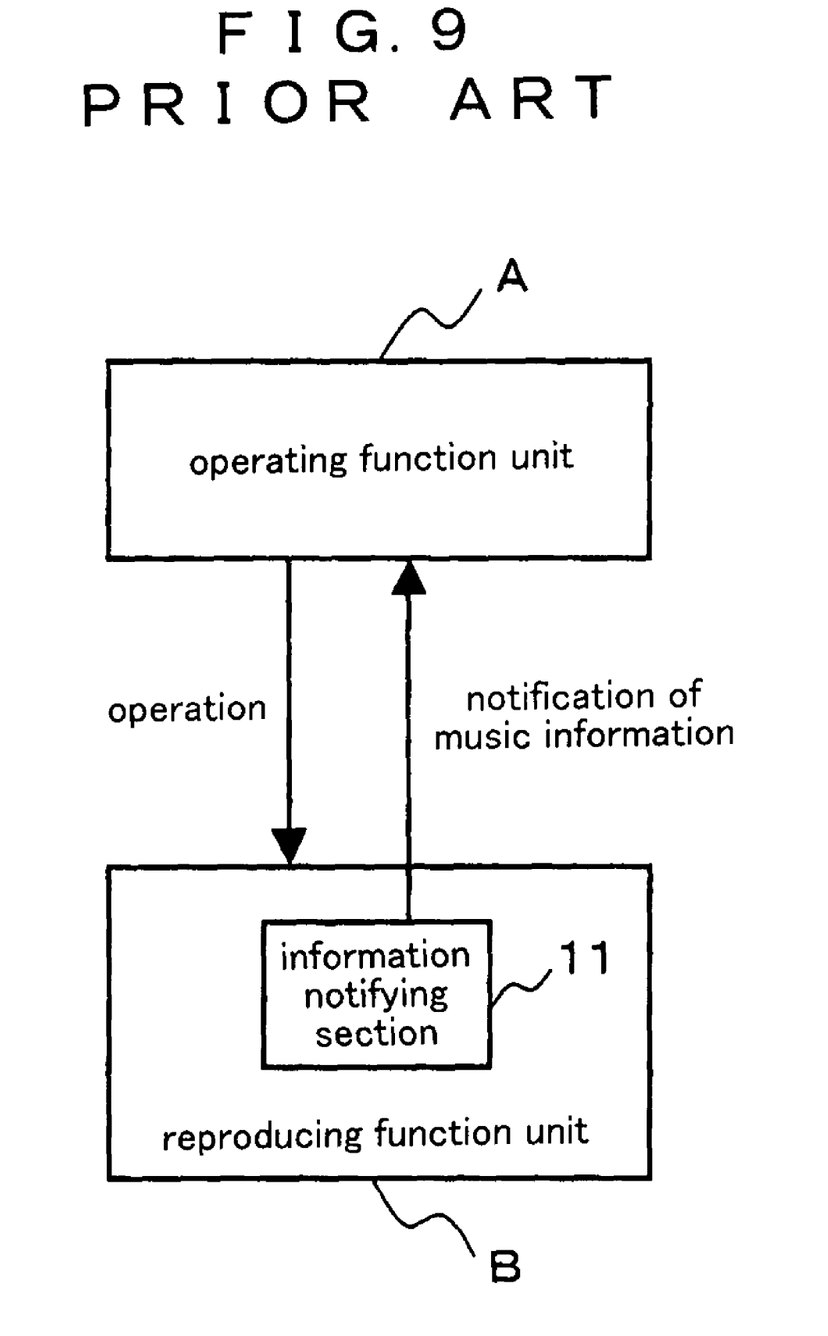
FIG. 9 is a block diagram illustrating a constitution of a music reproducing device according to a conventional technology.

FIG. 9 shows a constitution according to the conventional technology. When the operation is performed to start music reproduction in an operating function unit A, a reproducing function unit B reproduces music. During the music reproduction, an information notifying section 11 in the reproducing function unit B notifies the operating function unit A of information on the music.

However, the conventional reproducing device is disadvantageous in that the music information is often notified from the information notifying section 11 to the operating function unit A during the music reproduction, which makes it difficult for the operating function unit A to be inactive and results in an increase in the power consumption during the music reproduction.

SUMMARY OF THE INVENTION

Therefore, a main object of the present invention is to extend an inactive period of an operating function unit during music reproduction, reduce power consumption, and realize a long-duration music reproducing function.

A music reproducing device according to the present invention comprises an operating function unit and a reproducing function unit, wherein the reproducing function unit comprises:

an information notifying section for notifying the operating function unit of information of a piece of music to be reproduced;

a notification controlling section for controlling the notification of the music information to the operating function unit by the information notifying section when the operating function unit is in an inactive state; and a memory section for temporarily memorizing the music information from the information notifying section when the operating function unit is in the inactive state, and the operating function unit comprises an information obtaining section for obtaining the music information from the memory section when the operating function unit recovers from the inactive state to an active state.

According to the foregoing constitution, when the operating function unit is in the inactive state during the music reproduction by the reproducing function unit, the notification controlling section in the reproducing function unit halts the notification of the music information by the information notifying section to the operating function unit. The halt of the notification extends the inactive state of the operating function unit. When a user operates the operating function unit, the operating function unit shifts to the active state. Then, the notification controlling section in the reproducing function unit releases the halt of the notification by the information notifying section, and shifts to a position that allows the music information temporarily memorized in the memory section to be notified to the information obtaining section in the operating function unit. As described, the notification of the music information between the reproducing function unit and the operating function unit is minimized unless the user operates the operating function unit, or gives instructions otherwise, and an inactive period of the operating function unit during the music reproduction is thereby extended. As a result, power consumption can be reduced. Thus, a long-duration music reproducing function can be realized.

In the music reproducing device thus constituted, the operating function unit further comprises a reproduction information instructing section for instructing the reproduction of a selected piece of music to the reproducing function unit, and the reproducing function unit comprises a reproduction information storing section for storing information of a piece of music of which the reproduction is instructed, wherein if there is an instruction information of a piece of music to be subsequently reproduced in the reproduction information storing section when the reproduction of a piece of music being currently reproduced is ended, the reproducing function unit starts the reproduction of a piece of music to be subsequently reproduced and notifies the information obtaining section or the memory section of the information of a piece of music to be subsequently reproduced via the information notifying section.

In the foregoing constitution, the reproduction information instructing section in the operating function unit instructs the reproduction of a piece of music to be desirably reproduced. The information of the instruction is transmitted to the reproduction information storing section in the reproducing function unit and stored therein. When a piece of music currently being reproduced is ended, the reproducing function unit judges whether or not there is the instruction information of a piece of music to be subsequently reproduced in the reproduction information storing section. When the instruction information is present, the reproduction of a piece of music to be subsequently reproduced is started, and the information of a piece of music to be subsequently reproduced is transferred to the operating function unit or the memory section via the information notifying section. The processing described so far is repeated until there is no more instruction information of any pieces of music to be reproduced in the reproduction information storing section. Accordingly, it becomes unnecessary for the operating function unit to instruct the reproduction of a piece of music to be reproduced to the reproducing function unit every time a reproduced piece of music is switched from one after another in the case where there are two or more pieces of music to be reproduced. Therefore, the inactive period of the operating function unit during the music reproduction is extended, so that the power consumption is reduced. As a result, the long-duration music reproducing function can be realized.

In the music reproducing device thus constituted, there is further provided an inactive state shifting section for shifting the reproducing function unit itself which has been reproducing a piece of music to the inactive state after the music reproduction is ended.

Thus constituted, not only the operating function unit becomes inactive, but also the reproducing function unit itself can become inactive when the music reproduction is ended. As a result, the power consumption of the whole system can be further reduced.

In the music reproducing device comprising the inactive state shifting section as described above, the reproducing function unit comprises a power supply section for supplying power to the memory section so that the music information notified by the information notifying section is continuously memorized therein when the reproducing function unit which has been reproducing a piece of music is shifted to the inactive state.

Thus constituted, the music information memorized in the memory section of the reproducing function unit is retained, without being erased, by the continuous power supply to the memory section by the power supply section even after the reproducing function unit becomes inactive. Therefore, the operating function unit can obtain the music information which is available before the reproducing function unit becomes inactive from the memory section without the shift of the reproducing function unit from the inactive state to the active state.

A music reproducing machine according to the present invention comprises any of the music reproducing devices described so far and a speaker. Accordingly, the notification of the music information from the reproducing function unit to the operating function unit is controlled during the music reproduction by the reproducing function unit. As a result, an inactive period of the operating function unit during the music reproduction can be extended, and the long-duration music reproducing function can be realized.

The music information according to the present invention includes a part or all of various pieces of information relating to a piece of music such as a music title, an artist name, a reproducing time and a frequency band information. The music reproduction includes one-fold speed reproduction, high-speed reproduction, slow reproduction, rewinding, and the like.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

Hereinafter, preferred embodiments of a music reproducing device according to the present invention are described in detail referring to the drawings. The components shown in the preferred embodiments provided with the same reference symbols execute similar operation. Therefore, those components may not be redundantly described.

First Preferred Embodiment

Figure 1:
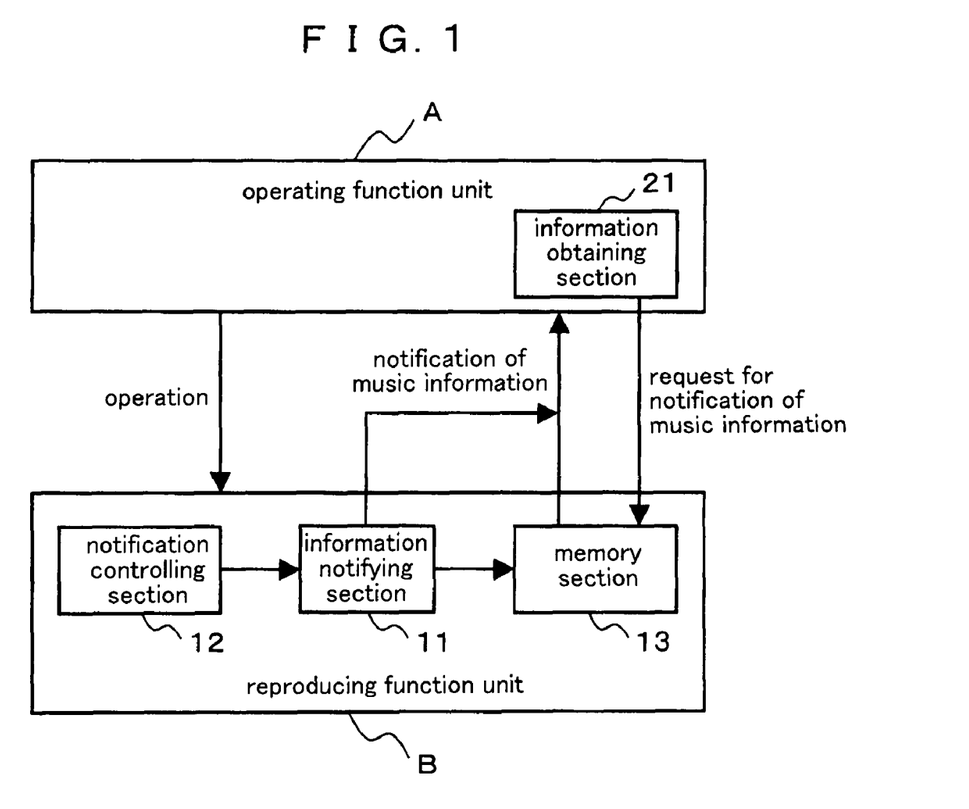
FIG. 1 is a block diagram illustrating a constitution of a music reproducing device according to a first preferred embodiment of the present invention.

FIG. 1 is a block diagram illustrating a constitution of a music reproducing device according to a first preferred embodiment of the present invention.

The music reproducing device comprises a reproducing function unit B and an operating function unit A. The reproducing function unit B comprises an information notifying section 11, a notification controlling section 12 and a memory section 13. The operating function unit A comprises an input operation section and a screen display section (both not shown), and further, an information obtaining section 21.

A function of the information notifying section 11 in the reproducing function unit B is to notify the operating function unit A of music information. A function of the notification controlling section 12 is to control the information notifying section 11, when the operating function unit A is in an inactive state, to thereby control the notification of the music information from the reproducing function unit B to the operating function unit A. The memory section 13 is configured to temporarily memorize the music information by the information notifying section 11 when the operating function unit A is in the inactive state. In the present preferred embodiment, it is assumed that music contents information is stored in an incorporated recording medium and a detachable recording medium (both not shown).

The information obtaining section 21 in the operating function unit A is configured to obtain the music information from the memory section 13 in the reproducing function unit B when the operating function unit A recovers from the inactive state to an active state.

The information notifying section 11, notification controlling section 12 and information obtaining section 21 are generally realized by MPU, a memory and the like, and processing steps of these components are realized by software. The software is stored in a recording medium such as ROM. Alternatively, the processing steps may be realized by hardware (exclusive circuit). The memory section 13 is generally realized by a memory or the like.

The operation of the music reproducing device according to the present preferred embodiment thus constituted is described referring to the flow charts shown in FIG. 2.

Figure 2A:
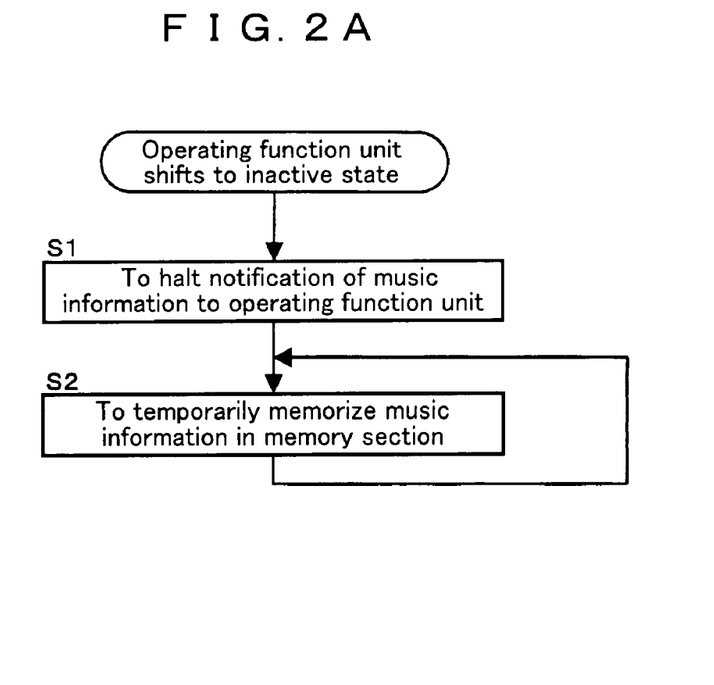
FIG. 2 show flow charts illustrating the operation of the music reproducing device according to the first preferred embodiment.
Figure 2B:
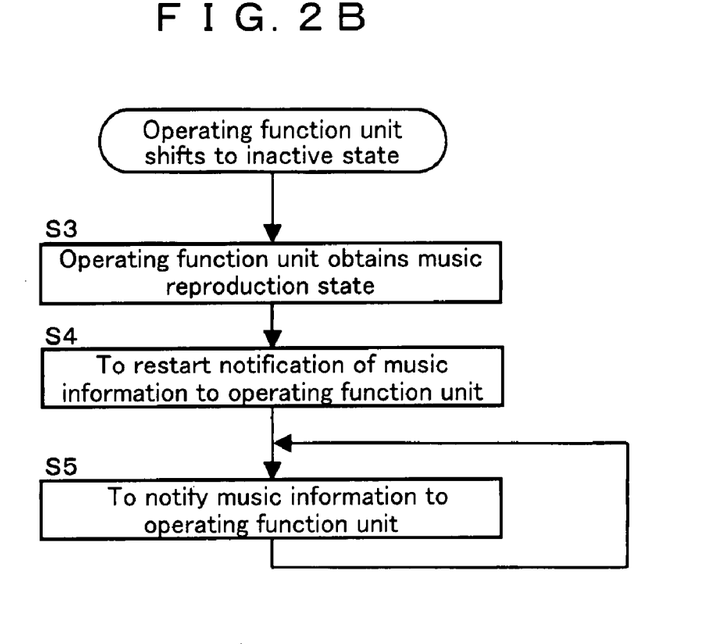

FIG. 2A is a flow chart illustrating the operation performed when the operating function unit A shifts to an inactive state, and FIG. 2B is a flow chart illustrating the operation performed when the operating function unit A shifts to an active state.

When the operating function unit A shifts to the inactive state during the music reproduction by the reproducing function unit B, processing in Step S1 starts.

In the Step S1, the notification controlling section 12 controls the information notifying section 11 to thereby halt the notification of the music information from the reproducing function unit B to the operating function unit A.

In Step S2, the information notifying section 11 makes the memory section 13 temporarily memorize the music information which was stopped being notified to the operating function unit A. Accordingly, the notification of the music information from the reproducing function unit B to the operating function unit A is prevented so that the operating function unit A can be shifted to the inactive state.

When the operating function unit A shifts to the active in response the an operation by a user during the music reproduction by the reproducing function unit B, processing in Step S3 starts.

In the Step S3, the information obtaining section 21 of the operating function unit A accesses the memory section 13 in the reproducing function unit B, and reads and obtains a music reproduction state temporarily memorized therein.

In Step S4, the notification controlling section 12 releases the control exerted over the information notifying section 11, and allows a restart of the notification of the music information from the reproducing function unit B to the operating function unit A by the information notifying section 11.

In Step S5, the music information is notified from the reproducing function unit B to the operating function A. The music information is continuously notified until the operating function unit A shifts to the inactive state or the music reproduction is ended.

The Step S1 and the Step S2, or the Step S3 and the Step S4 may be implemented in the reversed order. Further, the processing may be ended by the power supply being turned off or in response to the processing termination interrupt.

As described, according to the present preferred embodiment, the notification of the music information from the reproducing function unit B to the operating function unit A is controlled during the music reproduction by the reproducing function unit B, and an inactive period of the operating function unit A during the music reproduction is thereby extended. As a result, power consumption is reduced, and a long-duration music reproducing function can be realized.

Second Preferred Embodiment

Figure 3:
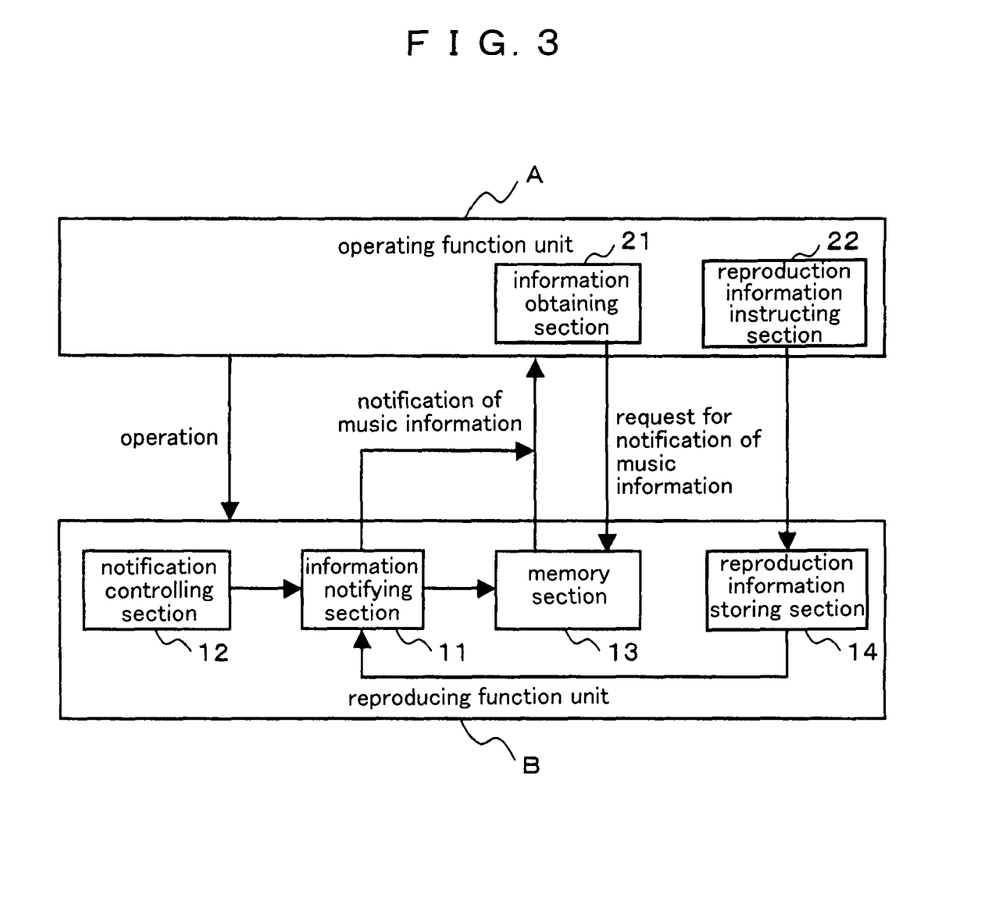
FIG. 3 is a block diagram illustrating a constitution of a music reproducing device according to a second preferred embodiment of the present invention.

FIG. 3 is a block diagram illustrating a constitution of a music reproducing device according to a second preferred embodiment of the present invention. The same references shown in FIG. 3 as those shown in FIG. 1 according to the first preferred embodiment denote the same components. The constitution according to the present preferred embodiment is characterized as follows.

The operating function unit A further comprises a reproduction information instructing section 22 for giving an instruction on the reproduction of one selected piece or two or more selected pieces of music to be subsequently reproduced to the reproducing function unit B. The reproducing function unit B further comprises a reproduction information storing section 14 for storing information of one selected piece or two or more selected pieces of music to be subsequently reproduced received from the reproduction information instructing section 22 of the operating function unit A. The reproducing function unit B is so configured that when there is the reproduction instruction information of any pieces of music to be reproduced in the reproduction information storing section 14, the reproduction of the music to be subsequently reproduced is started, and the information notifying section 11 obtains the music information and notifies the operating function unit A or the memory section 13 of the music information. The reproduction information instructing section 22 is generally realized by MPU, a memory or the like, and processing steps thereof are realized by software. The software is stored in a recording medium such as ROM. Alternatively, the processing steps may be realized by hardware (exclusive circuit). The reproduction information storing section 14 is generally realized by a memory or the like. The description about the rest of the constitution, which is similar to that of the first preferred embodiment, is omitted.

Figure 4:
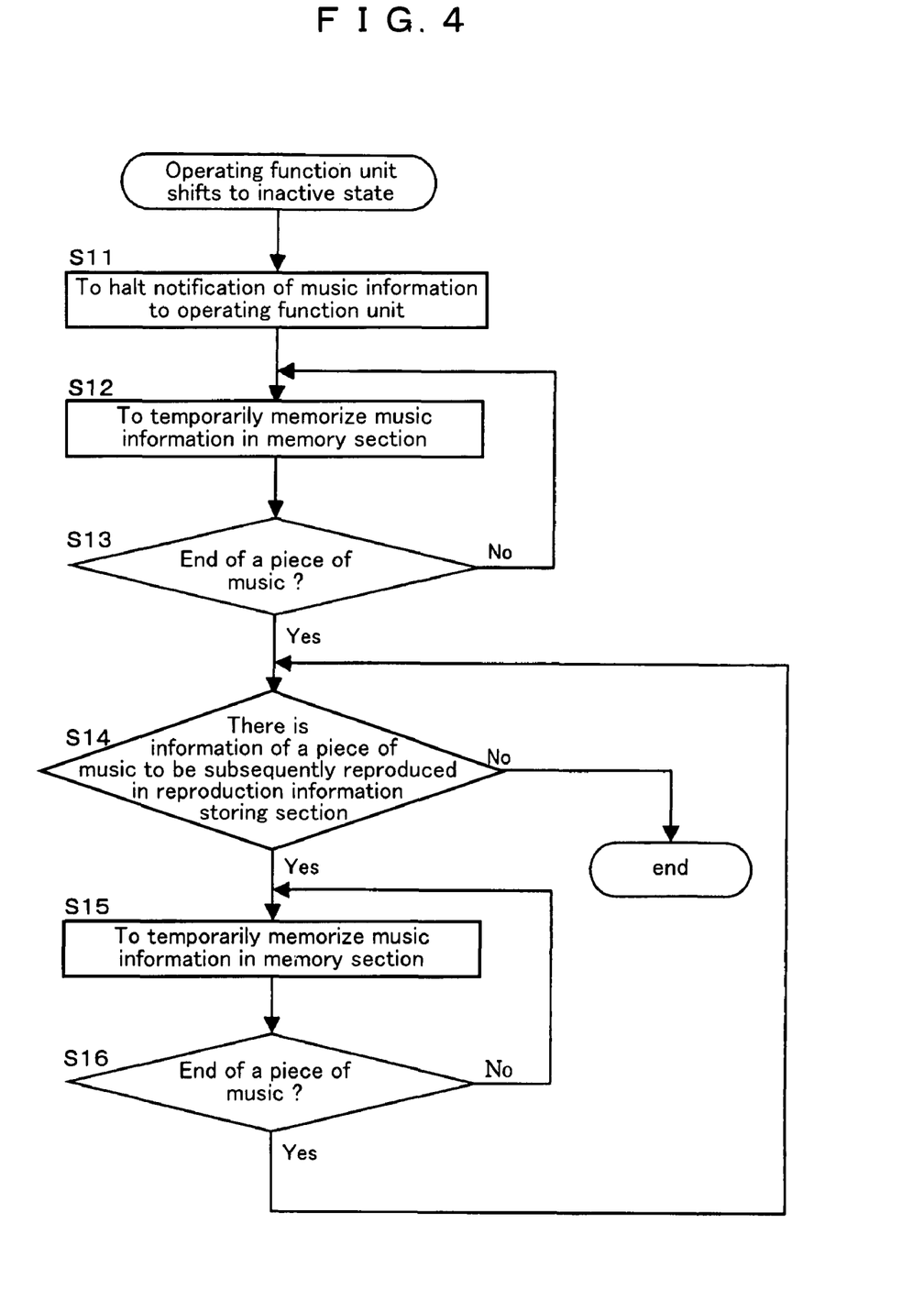
FIG. 4 is a flow chart illustrating the operation of the music reproducing device according to the second preferred embodiment.

The operation of the music reproducing device according to the present preferred embodiment thus constituted is described referring to the flow chart shown in FIG. 4.

The reproduction information instructing section 22 in the operating function unit A instructs the reproduction of a piece of music to be desirably reproduced. The instruction information is transmitted to and stored in the reproduction information storing section 14 in the reproducing function unit B.

When the operating function unit A shifts to an inactive state during the music reproduction by the reproducing function unit B, processing in Step S11 starts.

In the Step S11, the notification controlling section 12 controls the information notifying section 11 to thereby halt the notification of the music information from the reproducing function B to the operating function unit A.

In Step S12, the information notifying section 11 makes the memory section 13 temporarily memorize the music information which was stopped being notified to the operating function unit A. The notification of the music information from the reproducing function unit B to the operating function unit A is prevented so that the operating function unit A can shift to the inactive state.

In Step S13, it is judged whether or not a piece of music currently being reproduced is ended, and the processing advances to Step S14 when a piece of music currently being reproduced is ended.

In the Step S14, the reproducing function unit B judges whether or not the instruction information of a piece of music to be subsequently reproduced is stored in the reproduction information storing section 14. In the case where the instruction information of a piece of music to be subsequently reproduced is stored, the processing advances to Step S15, wherein the reproduction of a piece of music to be reproduced starts, and the music information is obtained by the information notifying section 11 and temporarily memorized in the memory section 13. The above processes are repeated until it is judged there is no piece of music to be reproduced in the reproduction information storing section 14. In the case where no more information of music to be reproduced is registered in the reproduction information storing section 14, the music reproduction is ended. It can be confirmed that no more information of music to be reproduced is registered in the reproduction information storing section 14 when it is determined that all pieces of music to be reproduced have already been reproduced after every reproduced piece of music was checked with a raised flag or the like, or in such a manner that the information of a reproduced piece music is erased from the reproduction information storing section 14 until there is no more information stored therein.

The Step S11 and the Step S12 may be implemented in the reversed order. Further, the processing may be ended by the power supply being turned off or in response to the processing termination interrupt.

As described, according to the present invention, it becomes unnecessary for the operating function unit A to provide the information of a piece of music to be reproduced to the reproducing function unit B every time a reproduced piece of music is switched from one after another when two or more pieces of music are reproduced. Therefore, an inactive period of the operating function unit A during the music reproduction is extended, and the power consumption is thereby reduced. As a result, the long-duration music reproducing function can be realized.

Third Preferred Embodiment

Figure 5:
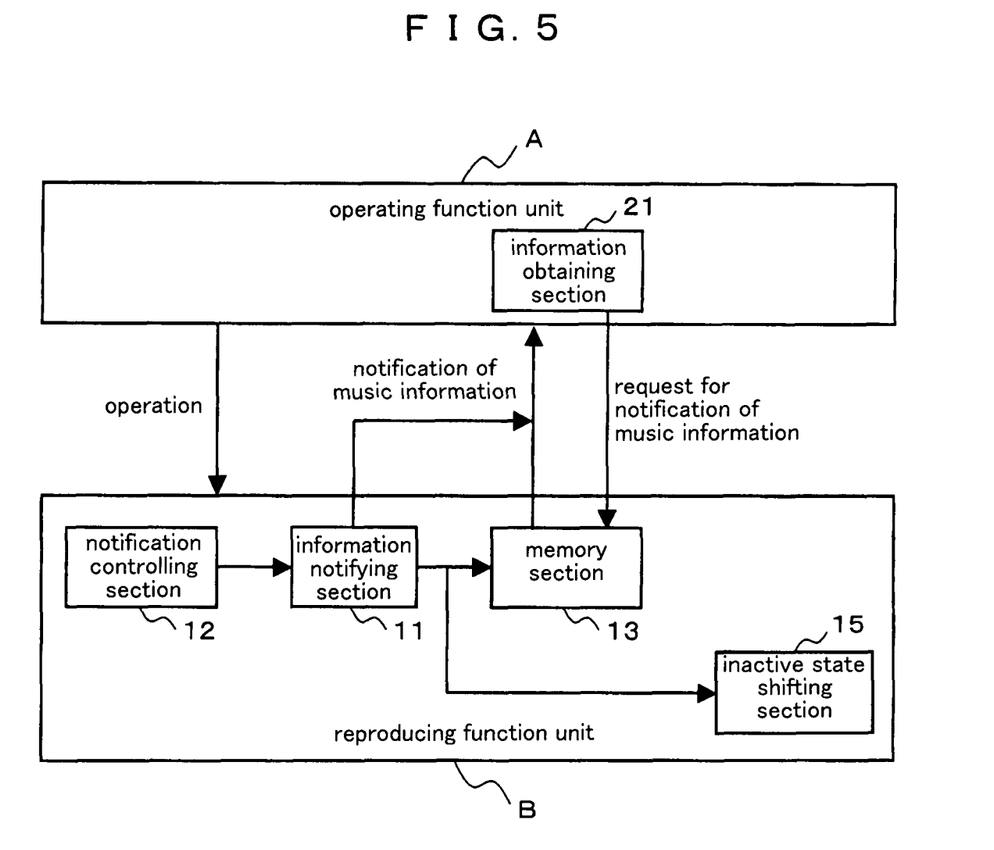
FIG. 5 is a block diagram illustrating a constitution of a music reproducing device according to a third preferred embodiment of the present invention.

FIG. 5 is a block diagram illustrating a constitution of a music reproducing device according to a third preferred embodiment of the present invention. The same references shown in FIG. 5 as those shown in FIG. 1 according to the first preferred embodiment denote the same components. The constitution according to the present preferred embodiment is characterized as follows.

The reproducing function unit B further comprises an inactive state shifting section 15. A function of the inactive state shifting section 15 is to shift the reproducing function unit B itself to the inactive state when the music reproduction by the reproducing function unit B is ended. The inactive state shifting section 15 is generally realized by MPU, a memory or the like, and processing steps thereof are realized by software. The software is stored in a recording medium such as ROM. Alternatively, the processing steps may be realized by hardware (exclusive circuit). The description of the rest of the constitution, which is similar to that of the first preferred embodiment, is omitted.

Figure 6:
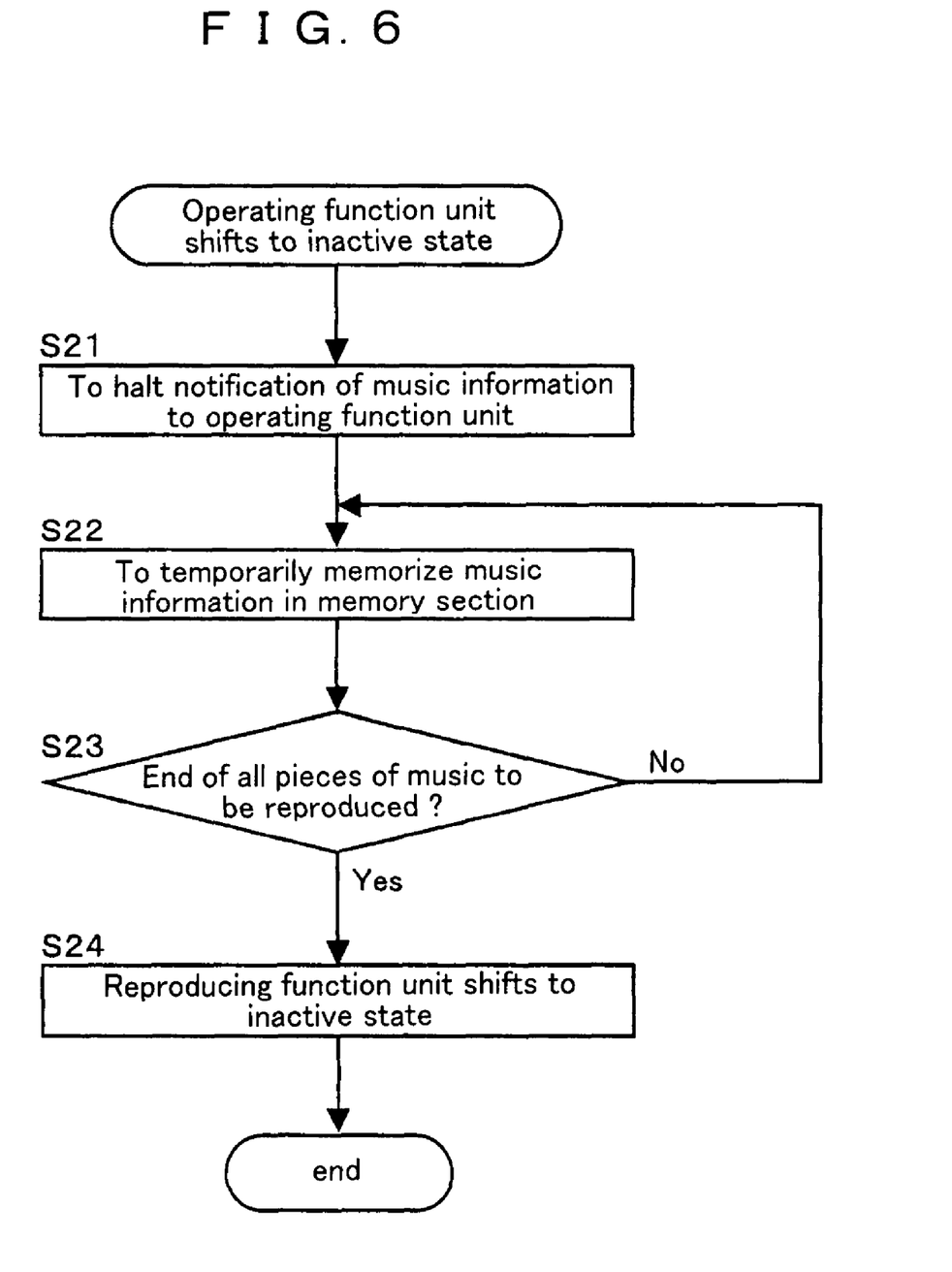
FIG. 6 is a flow chart illustrating the operation of the music reproducing device according to the third preferred embodiment.

The operation of the music reproducing device according to the present preferred embodiment thus constituted is described referring to flow charts shown in FIG. 6.

When the operating function unit A shifts to the inactive state during the music reproduction by the reproducing function unit B, processing in Step S21 starts.

In the Step S21, the notification controlling section 12 controls the information notifying section 11 to thereby halt the notification of the music information from the reproducing function unit B to the operating function unit A.

In Step S22, the information notifying section 11 makes the memory section 13 temporarily memorize the music information which was stopped being notified to the operating function unit A. The notification of the music information from the reproducing function unit B to the operating function unit A is prevented so that the operating function unit A can shift to the inactive state.

In Step S23, it is judged whether or not all pieces of music to be reproduced have already been reproduced, and the processing advances to Step S24 based on the conclusion that the reproduction has been completed.

In Step S24, the inactive state shifting section 15 makes the reproducing function unit B shift to the inactive state.

The Step S21 and the Step S22 may be implemented in the reversed order. Further, the processing may be ended by the power supply being turned off or in response to the processing termination interrupt.

As described, according to the present invention, not only the operating function unit A is shifted to the inactive state, but also the reproducing function unit B is shifted to the inactive state after the music reproduction is ended. As a result, the power consumption of the whole system is maximally reduced, and the long-duration music reproducing function can be realized.

Fourth Preferred Embodiment

Figure 7:
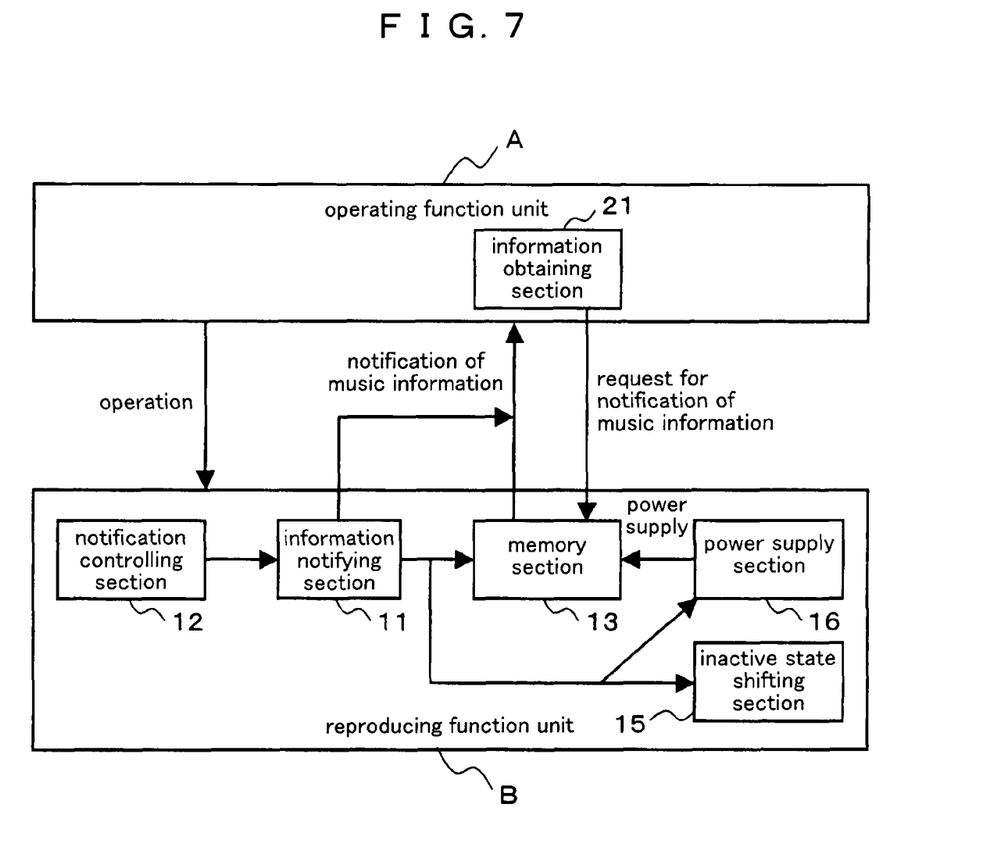
FIG. 7 is a block diagram illustrating a constitution of a music reproducing device according to a fourth preferred embodiment of the present invention.

FIG. 7 is a block diagram illustrating a constitution of a music reproducing device according to a fourth preferred embodiment of the present invention. The same references shown in FIG. 7 as those shown in FIG. 5 according to the third preferred embodiment denote the same components. The constitution according to the present preferred embodiment is characterized as follows.

The reproducing function unit B further comprises a power supply section 16. The power supply section 16 is configured to supply power to the memory section 13 so that the music information notified by the information notifying section 11 is continuously memorized therein when the reproducing function unit B which has been reproducing the music is made to be shifted to the inactive state by the inactive state shifting section 15. The memory section 16 is generally realized by MPU, a memory or the like, and processing steps thereof are realized by software. The software is stored in a recording medium such as ROM. Alternatively, the processing steps may be realized by hardware (exclusive circuit). The description of the rest of the constitution, which is similar to that of the third preferred embodiment, is omitted.

Figure 8:
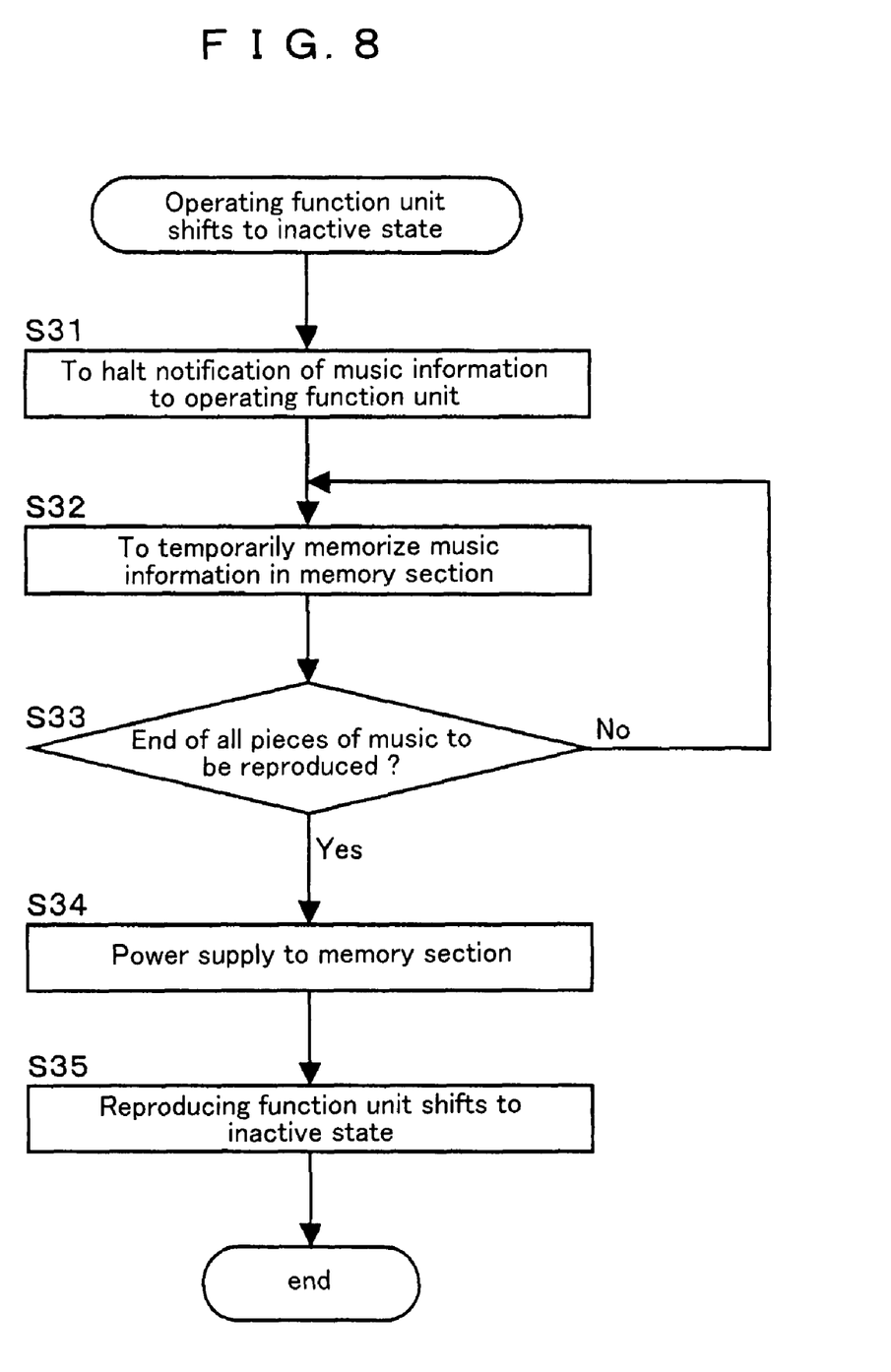
FIG. 8 is a flow chart illustrating the operation of the music reproducing device according to the fourth preferred embodiment.

The operation of the music reproducing device according to the present preferred embodiment thus constituted is described referring to the flow chart shown in FIG. 8.

When the operating function unit A shifts to the inactive state during the music reproduction by the reproducing function unit B, processing in Step S31 starts.

In the Step S31, the notification controlling section 12 controls the information notifying section 11 to thereby halt the notification of the music information from the reproducing function unit B to the operating function unit A.

In Step S32, the information notifying section 11 makes the memory section 13 temporarily memorize the music information which was stopped being notified to the operating function unit A. The notification of the music information from the reproducing function unit B to the operating function unit A is prevented so that the operating function unit A can shift to the inactive state.

In Step S33, it is judged whether or not the reproduction of all pieces of music to be reproduced has been ended, and the processing advances to Step S34 if already ended.

In the Step S34, the power supply section 16 supplies the power to the memory section 13.

In Step S35, the inactive state shifting section 15 makes the reproducing function unit B, except for the memory section 13, shift to the inactive state.

The Step S31 and the Step S32 may be implemented in the reversed order. Further, the processing may be ended by the power supply being turned off or in response to the processing termination interrupt As described, according to the present invention, the memory section 13 is continuously supplied with power after the reproducing function unit B becomes inactive, so that the music information temporarily memorized in the memory section 13 is not erased but can be retained. Therefore, the operating function A can obtain the details of the music information which is available before the shift to the inactive state. Further, when the power supply section 13 is continuously supplied with power, the music information can be obtained from the memory section 13 when the operating function unit A shifts to the active state without the shift of the reproducing function unit B from the inactive state to the active state.

The present invention can be implemented based on any arbitrary combination of the preferred embodiments described so far.

The processing according to the present preferred embodiments may be realized by software, and the software may be downloaded and then distributed. Further, the software may be stored in a recording medium such as CD-ROM and then distributed.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A music reproducing device comprising:
an operating function unit; and
a reproducing function unit, wherein
the reproducing function unit comprises:
   an information notifying section for notifying the operating function unit of music information of a piece of music to be reproduced;
   a notification controlling section for halting the notification of the music information to the operating function unit by the information notifying section when the operating function unit is in an inactive state; and
   a memory section for temporarily memorizing the music information from the information notifying section when the operating function unit is in the inactive state, and
the operating function unit comprises an information obtaining section for obtaining the music information from the memory section when the operating function unit recovers from the inactive state to an active state.

2. The music reproducing device as claimed in claim 1, wherein:
the operating function unit further comprises a reproduction information instructing section for instructing the reproduction of a selected piece of music to the reproducing function unit,
the reproducing function unit comprises a reproduction information storing section for storing information of a piece of music of which reproduction is instructed, and
the reproducing function unit is configured to start the reproduction of a piece of music to be subsequently reproduced if there is an instruction information of a piece of music to be subsequently reproduced in the reproduction information storing section when the reproduction of a piece of music being currently reproduced is ended and notify the information obtaining section or the memory section of information of a piece of music to be subsequently reproduced via the information notifying section.

3. The music reproducing device as claimed in claim 1, further comprising an inactive state shifting section for shifting the reproducing function unit itself which has been reproducing a piece of music to the inactive state after the music reproduction is ended.

4. The music reproducing device as claimed in claim 3, wherein
the reproducing function unit comprises a power supply section for supplying power to the memory section so that the music information notified by the information notifying section is continuously memorized therein when the reproducing function unit which has been reproducing a piece of music is shifted to the inactive state.

5. A music reproducing machine comprising the music reproducing devices claimed in claim 1 and a speaker.

\* \* \* \* \*